A. WALKER.
OIL SEED COOKER.
APPLICATION FILED APR. 4, 1914.

1,200,057.

Patented Oct. 3, 1916.
8 SHEETS—SHEET 1.

Witnesses:
K. E. Long
M. Runale

Anthony Walker Inventor
By his Attorney

A. WALKER.
OIL SEED COOKER.
APPLICATION FILED APR. 4, 1914.

1,200,057.

Patented Oct. 3, 1916.
8 SHEETS—SHEET 3.

Witnesses:
H. E. Long
M. Rumely

Anthony Walker Inventor
By his Attorney
Alan Whamann

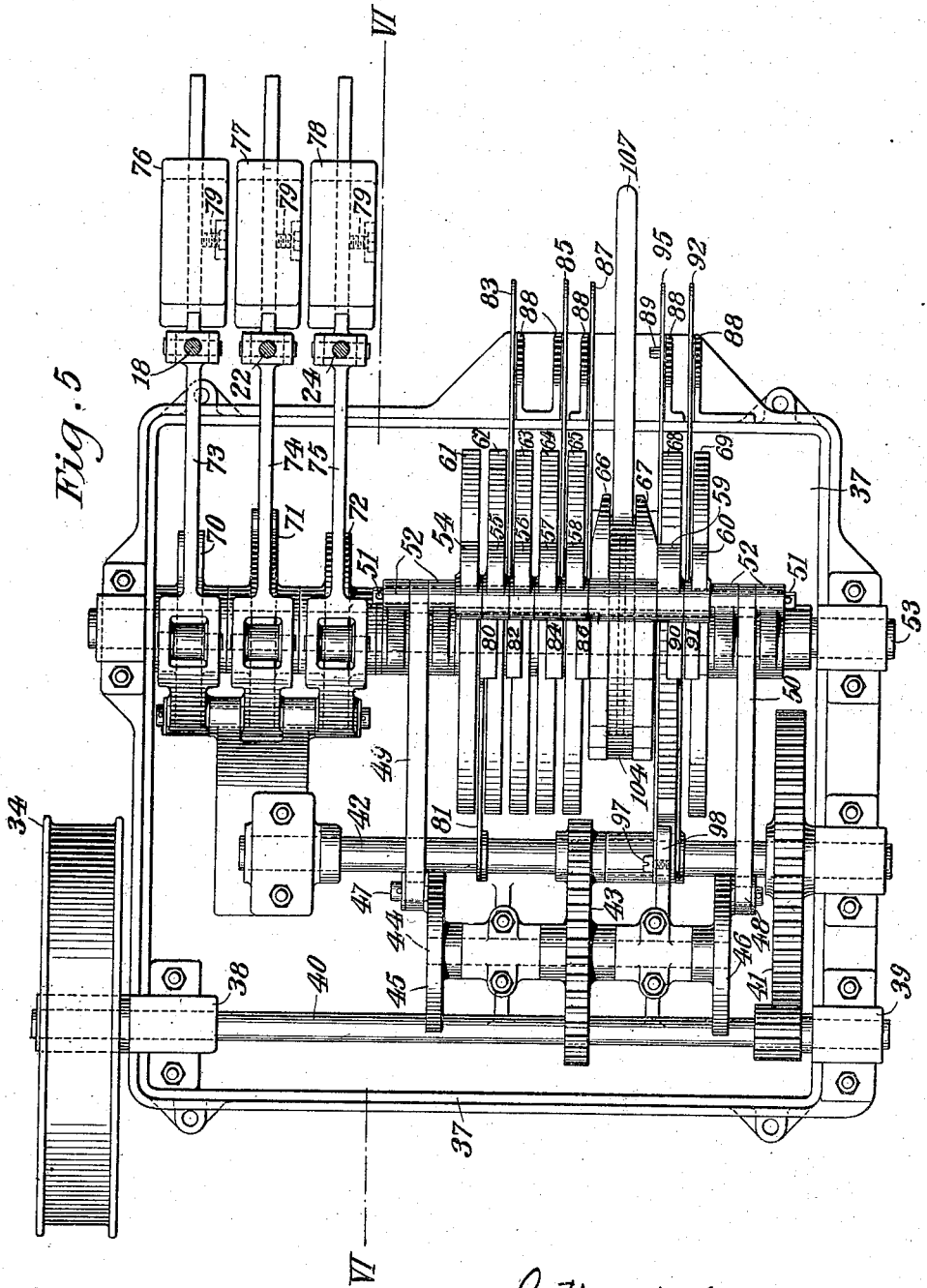

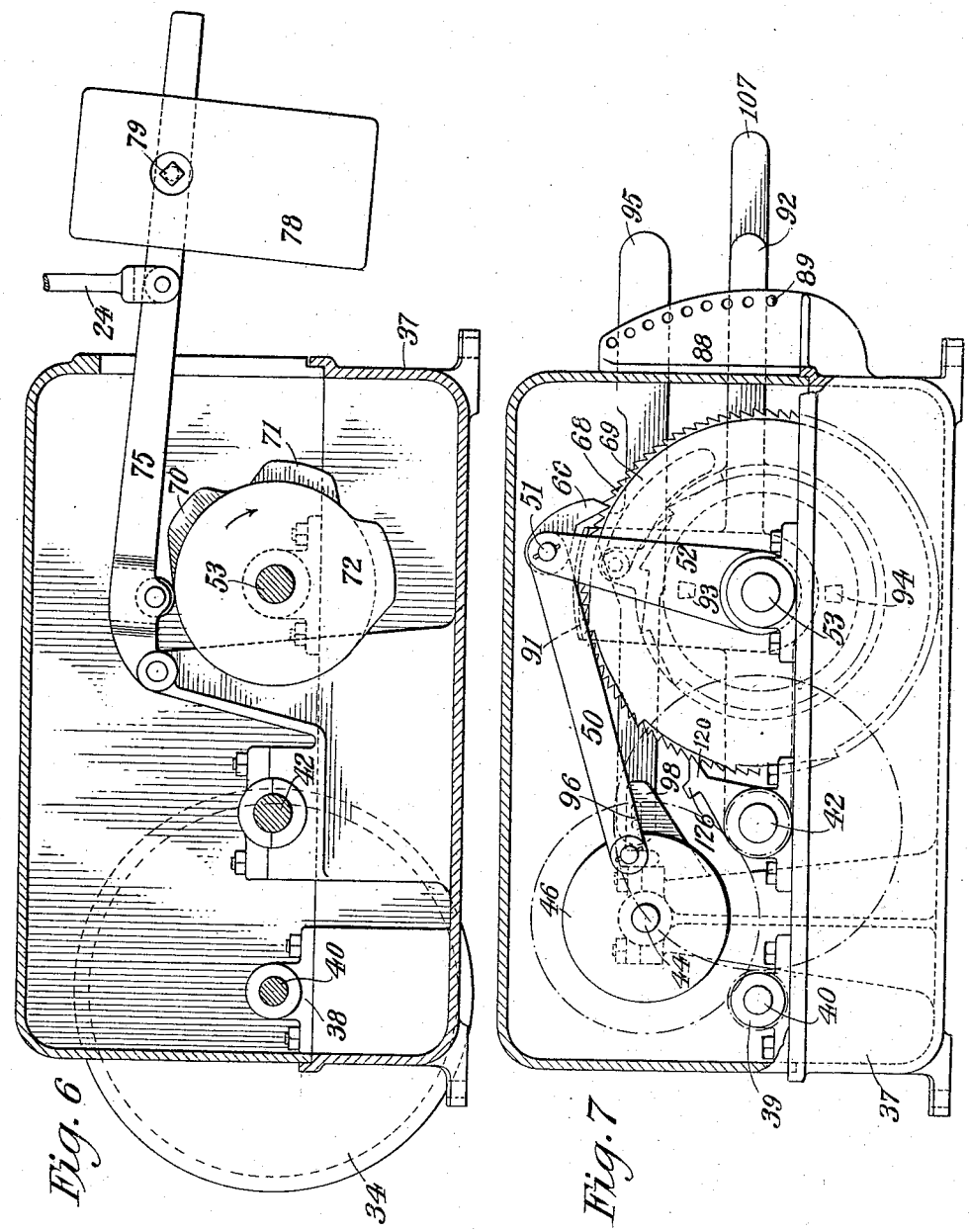

A. WALKER.
OIL SEED COOKER.
APPLICATION FILED APR. 4, 1914.
1,200,057.
Patented Oct. 3, 1916.
8 SHEETS—SHEET 6.
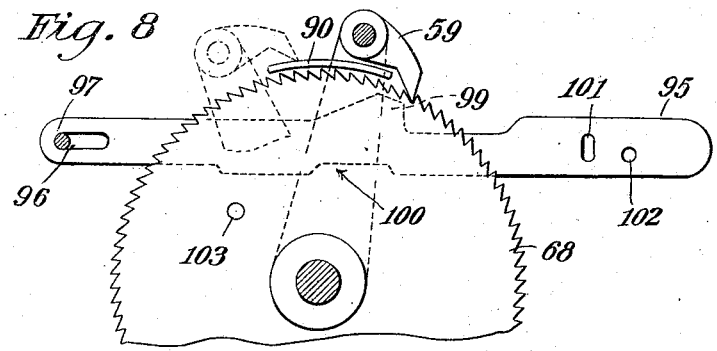
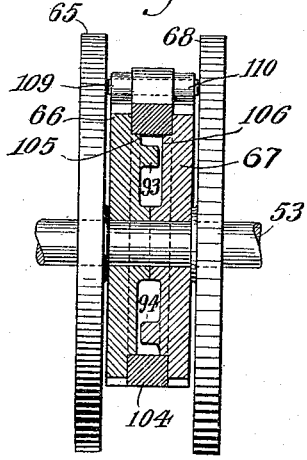
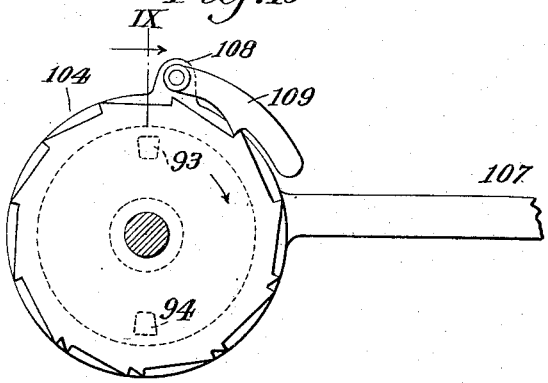
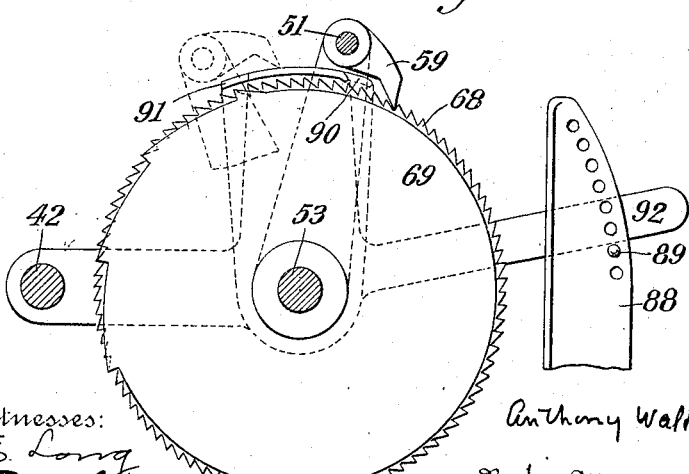

A. WALKER.
OIL SEED COOKER.
APPLICATION FILED APR. 4, 1914.

1,200,057. Patented Oct. 3, 1916.
8 SHEETS—SHEET 7.

Anthony Walker Inventor

By his Attorney

Witnesses:

UNITED STATES PATENT OFFICE.

ANTHONY WALKER, OF DAYTON, OHIO, ASSIGNOR TO THE PLATT IRON WORKS COMPANY, OF DAYTON, OHIO, A CORPORATION OF MAINE.

OIL-SEED COOKER.

1,200,057.  Specification of Letters Patent.  Patented Oct. 3, 1916.

Application filed April 4, 1914.  Serial No. 829,407.

*To all whom it may concern:*

Be it known that I, ANTHONY WALKER, a citizen of the United States, residing at Dayton, in the county of Montgomery and State of Ohio, have invented certain new and useful Improvements in Oil-Seed Cookers, of which the following is a specification, reference being had to the accompanying drawings, in which—

Figure 1:
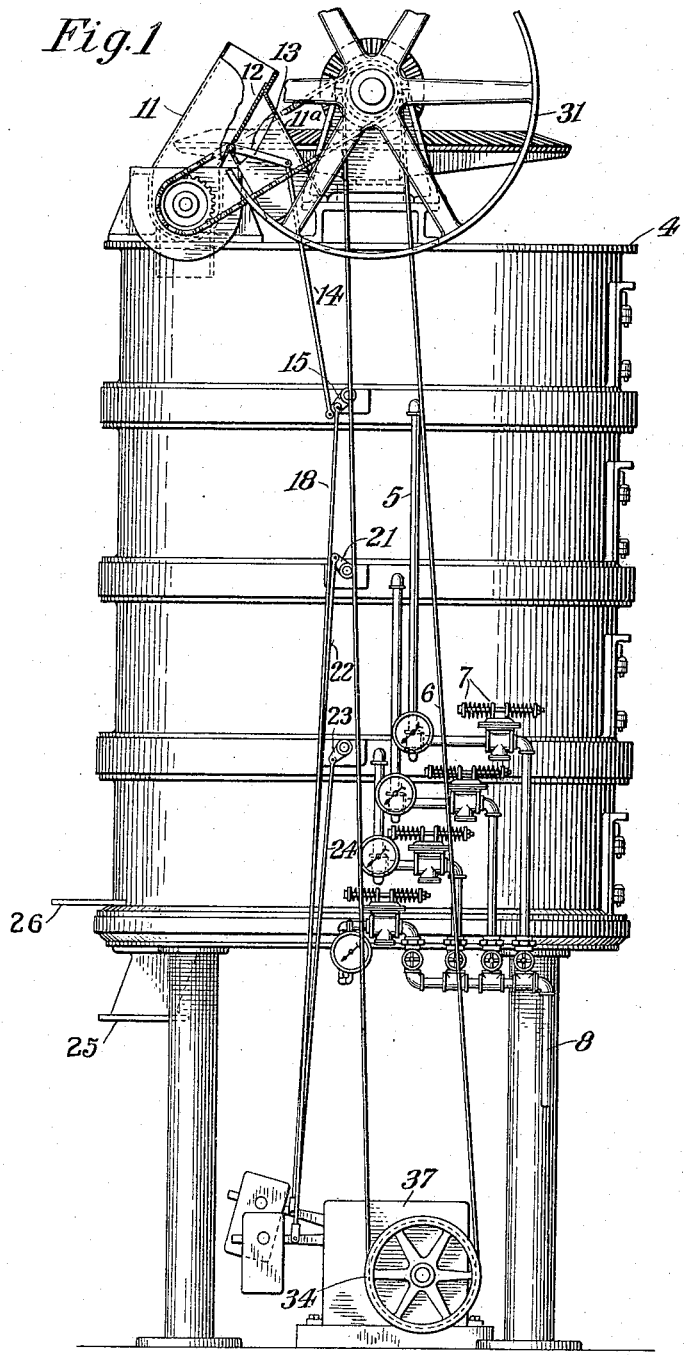
Figure 2:
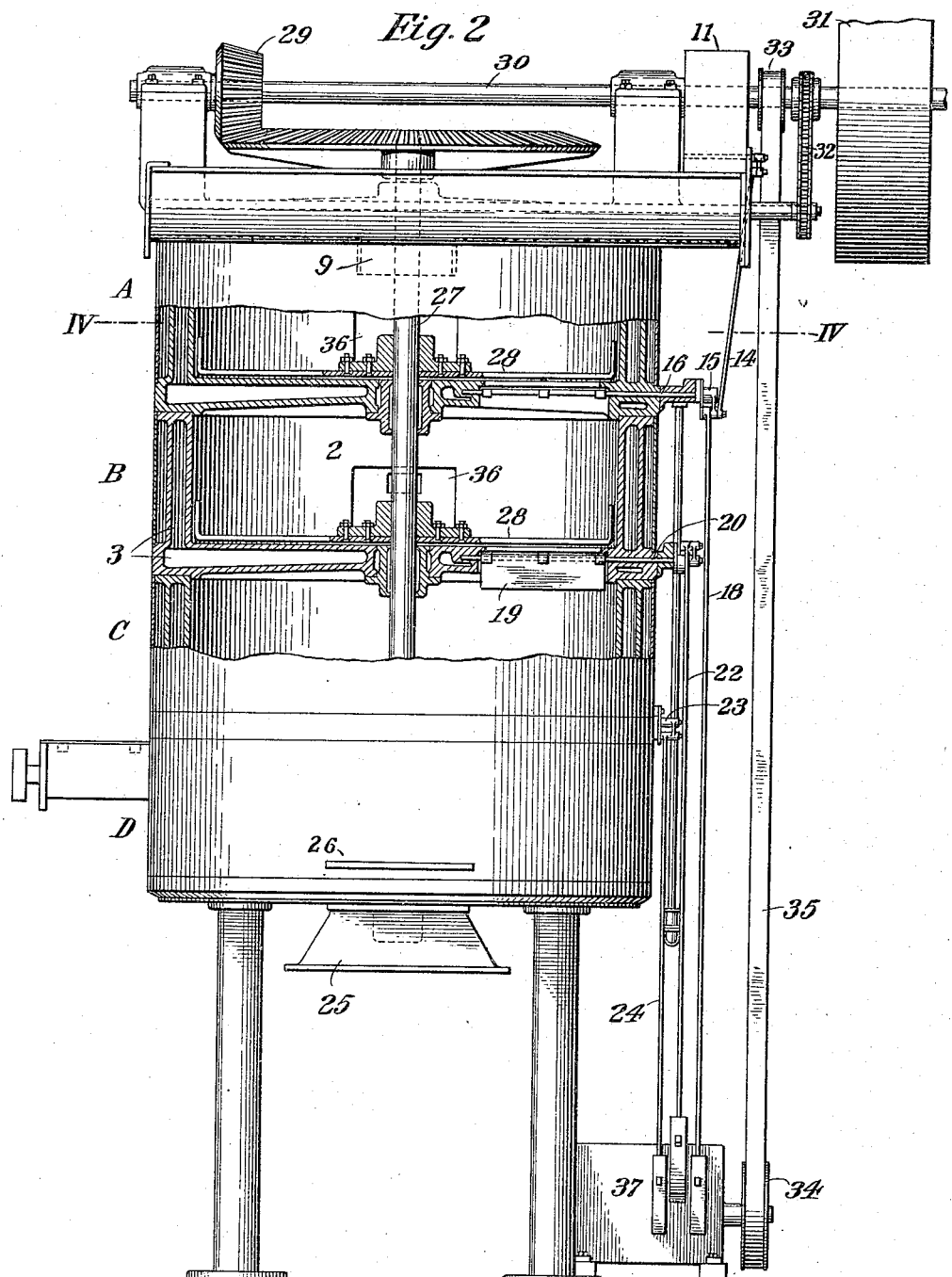
Figure 3:
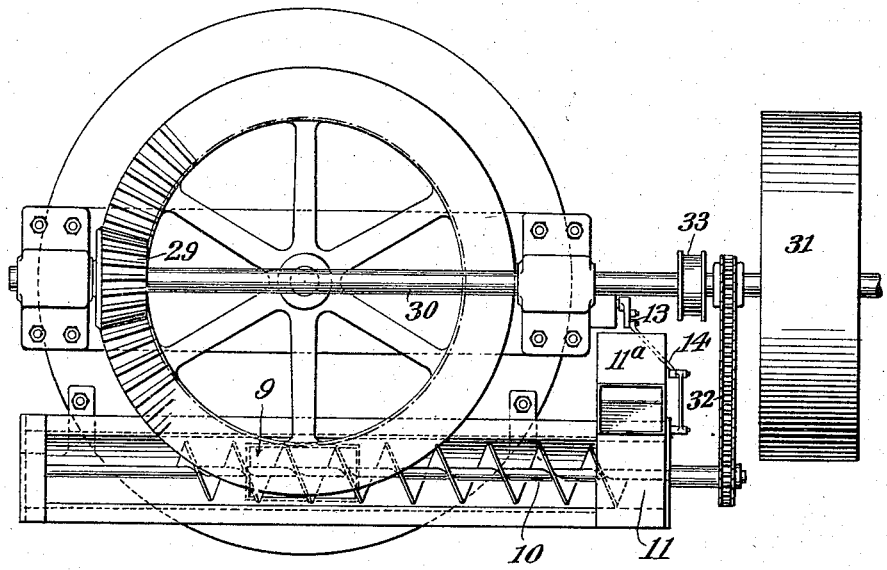
Figure 4:
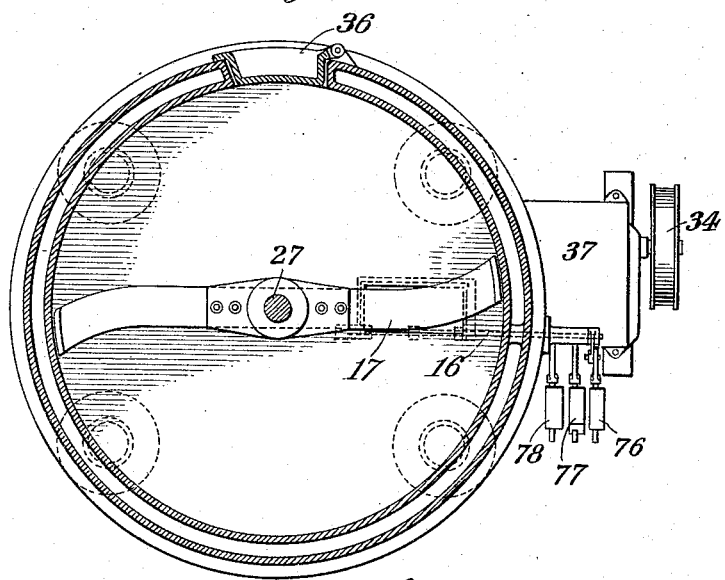
Figure 12:
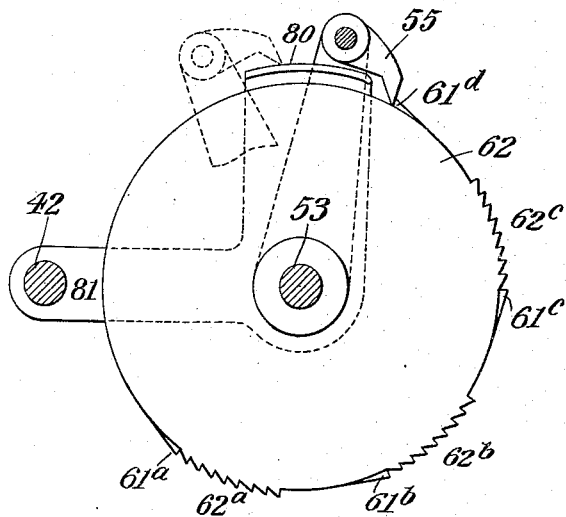
Figure 13:
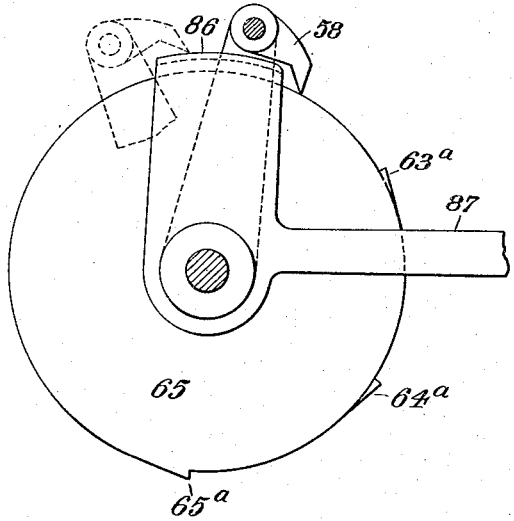
Figure 14:
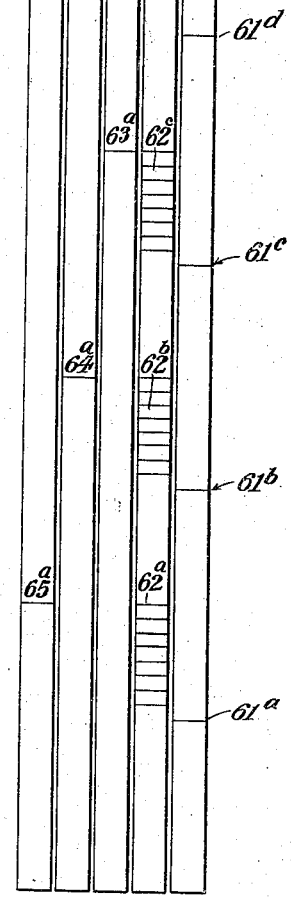
Figure 15:
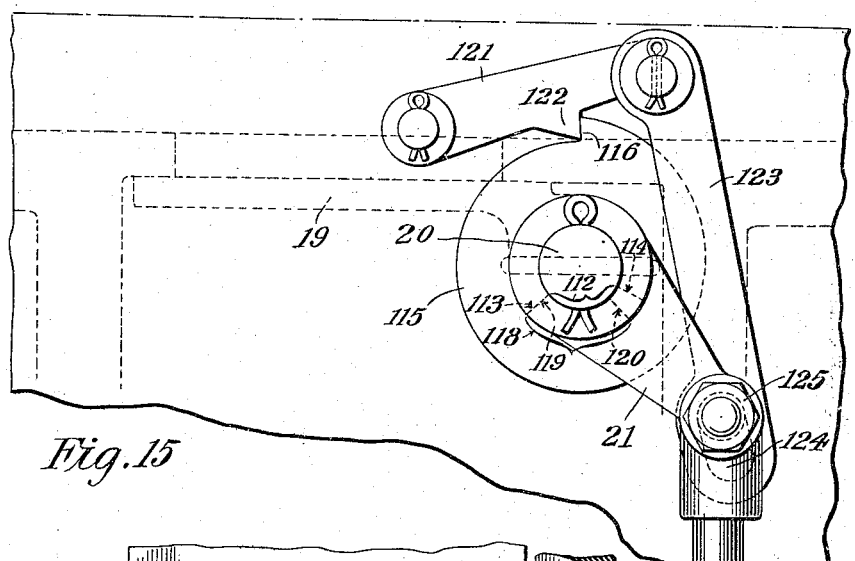
Figure 16:
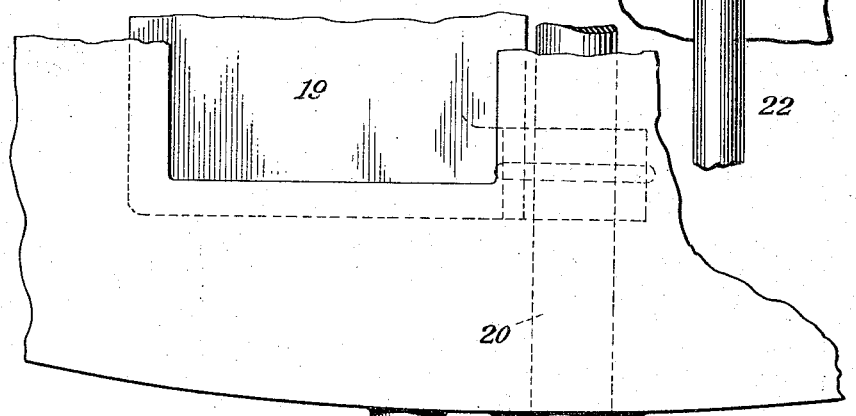

Figure 1 is a front elevation of my cooker, with a portion of the feeding chute broken away; Fig. 2 is a side elevation with a portion of the casing broken away; Fig. 3 is a plan view; Fig. 4 is a section on line IV—IV of Fig. 2; Fig. 5 is a plan view on an enlarged scale of the controlling mechanism, with the cover of the gear box removed; Fig. 6 is a section on line VI—VI of Fig. 5; Fig. 7 is a side view of the control mechanism with a portion of the gear box broken away and some of the gear wheels removed; Fig. 8 is a detail of the mechanism by which the "over all" timing device can be thrown out of operation; Fig. 9 is a detail view partly in section showing the manner in which the "over all" timing mechanism and the gate operating mechanism are connected; Fig. 10 is a detail view of the lever device whereby the "over all" timing may be manually controlled; Fig. 11 is a detail view showing the manner in which the "over all" timing device may be adjusted; Fig. 12 is a detail view of the timing wheels of the gate operating mechanism; Fig. 13 is a detail view of the wheels by which the timing of the gate operating mechanism may be adjusted; Fig. 14 is a development of the ratchet wheels of the gate operating mechanism; Fig. 15 is an enlarged view of a locking device for the gates, and Fig. 16 is a plan view of this locking device.

My invention relates to cookers for treating seed from which the oil is to be removed by subsequent pressing, such as cotton seed, and deals particularly with those cookers in which the seed meal is warmed in one kettle, cooked in one or more other kettles, and then retained and kept warm in a last kettle, and has to do with the manner in which the meal is passed from one of these chambers to the next. Heretofore such cookers as have been designed to operate continuously have been so arranged that the meal was either continuously discharged from one kettle to the next, or was discharged in small quantities at frequent intervals. In the cookers just described it is inevitable that some portions of the seed will be passed through a kettle and be discharged into the succeeding kettle almost at once, and will thus fail to secure the thorough cooking which is desired. At the same time, other portions will remain in the various kettles longer than is proper and will thus be overcooked.

By my invention I have produced a seed cooker in which an entire batch of meal will be discharged from one kettle to the kettle below before any meal is admitted into the first mentioned kettle from the kettle above, and in which the successive discharges of the meal from one kettle to another will be mechanically controlled. This operation permits the uniform cooking of the meal in each kettle and enables the production of properly cooked meal independent of the reliability or skill of the operator.

My invention also consists in the construction and operation of the various parts which I shall hereinafter describe and claim.

Referring to the drawings in which I have shown a preferred embodiment of my invention, the letters A, B, C and D indicate four superimposed kettles which may be made of cast iron or any other suitable material, and consists of a central chamber 2 surrounded by a steam jacket 3 of ordinary construction. Kettle A is intended to be used as a receiving chamber in which the meal is warmed. Kettles B and C are cooking kettles and kettle D is a retaining chamber in which the cooked meal is kept warm until taken to the oil press by the operator. The kettle A is provided with a lid 4, while the bottom of kettle A serves as a lid for the kettle B, the bottom of the kettle B as a lid for the kettle C, and the bottom of the kettle C as a lid for the kettle D. Connected with the steam jacket of each of the kettles A, B, C and D is a steam inlet pipe 5, provided with a gage 6 and a reducing valve 7, and connected with a common steam supply pipe 8, which may be supplied with steam from any convenient source. By providing a separate reducing valve 7 for each of the four kettles any desired pressure of steam may be maintained in the jacket 3 of each of the four kettles. In the lid 4 of kettle A is an opening 9, to which the meal or seed to be cooked is brought by a rotary conveyer 10 from the chute 11. The chute 11 is provided with a gate 12, which may be closed to prevent meal being introduced into the kettle A. When the gate 12 is closed the seed meal will pass through the auxiliary chute 11$^a$ into any convenient receptacle. The gate 12 is operated by a lever 13 and a rod 14, which is attached to the arm 15. The arm 15 is keyed on the shaft 16, to which is attached a hinged gate 17 in the floor of kettle A. The arm 15 is driven by the rod 18, which is attached to the controlling mechanism, as will be hereinafter described. The kettle B has a gate 19, similar to the gate 17, which is attached to the shaft 20, in which is keyed the arm 21, driven by the rod 22, which is likewise attached to the controlling mechanism. The kettle C has a similar gate, not shown, operated by the arm 23 and the rod 24, which is likewise attached to the controlling mechanism. Leading from the bottom of the kettle D is a chute 25, which is manually controlled by a slide 26. Through the center of the kettles runs a shaft 27, provided with stirring paddles 28 in each of the kettles. The shaft 27 is driven through bevel gears 29 and shaft 30 by any convenient source of power applied to the pulley wheel 31. A sprocket chain 32 serves to connect the shaft 30 with the rotary conveyer 10. The shaft 30 likewise carries a pulley 33, which is connected with pulley 34 on the controlling mechanism, by the belt 35. Each of the kettles A, B, C and D is provided with a door 36 for cleaning purposes.

My preferred form of controlling mechanism consists of a gear box 37, provided with bearings 38 and 39, in which the shaft 40 is rotated by the pulley 34 at a speed of approximately 72 R. P. M. Through the reducing gears 41, shaft 42 and reducing gears 43 the shaft 44 is driven at a speed of 4 R. P. M. The shaft 44 carries the two crank disks 45 and 46, having the eccentric pins 47 and 48. Attached to the eccentric pins 47 and 48 are connecting rods 49 and 50. These connecting rods 49 and 50 serve to give a reciprocating motion to the shaft 51.

The shaft 51 is carried by the arms 52, which are pivoted to the shaft 53. On the shaft 51 are pivoted pawls 54, 55, 56, 57, 58, 59 and 60. In the embodiment which is herein described the parts are so proportioned that these pawls will have a four inch working movement. The shaft 53 has keyed to it a ratchet wheel 61, designed to coöperate with the pawl 54, a ratchet wheel 62 designed to coöperate with the pawl 55, a ratchet wheel 63 designed to coöperate with the pawl 56, a ratchet wheel 64 designed to coöperate with the pawl 57, a ratchet wheel 65 designed to coöperate with the pawl 58, and the wheel 66. The shaft 53 likewise carries the wheel 67 and the ratchet wheels 68 and 69 designed to coöperate with the pawls 59 and 60 respectively. The wheels 67, 68 and 69 are not keyed to the shaft 53 but are attached together so that they will rotate in unison. In addition to the foregoing the shaft 53 has keyed to it the cam wheels 70 and 71 and 72. The cam wheel 70 coöperates with the lever 73, to which is attached the rod 18. The cam wheel 71 coöperates with the lever 74, to which is attached the rod 22; the cam wheel 72 coöperates with the lever 75, to which is attached the rod 24. The levers 73, 74 and 75 respectively carry weights 76, 77 and 78, which are slidably mounted on the said rods and may be held in any desired position by set screws 79. The weights 76, 77 and 78 serve to keep strain on the rods 18, 22 and 24 under normal conditions, and thus keep the doors in the floor of kettles A, B and C normally closed. As the cam wheels 70, 71 and 72 rotate, the levers 73, 74 and 75 are raised and open the doors in the floors of the kettles A, B and C.

I have found that under ordinary operating conditions it is desirable that the gates in the floors of the kettles A, B and C should remain closed for about twenty minutes and that the gate in the floor of kettle C should then open and remain open long enough for all of the charge in kettle C to be dumped into the kettle D; that as the gate in the floor of kettle C closes, the gate 19 in the floor of kettle B should open and remain open long enough for the charge in kettle B to be dumped, and likewise as the gate 19 closes the gate 17 in the floor of kettle A should open and remain open long enough for the charge in the kettle A to be dumped. In general practice, these gates will not have to be kept open more than two minutes. It will be seen that the working operations to be effected by the control mechanism consist in the operation of each of the gates in the bottom of the kettles A, B, and C, and in the proper regulation of the movements of such gates. In order to obtain proper results it is necessary that each batch remain in each kettle a predetermined period of time and that the length of such period shall be readily and accurately adjusted. It is further desirable that, as an entirely separate element of adjustment, means be provided for controlling the length of time which each of the bottom gates shall remain open so that the gates will remain open only just long enough to allow the entire batch to be dumped. The manner in which these results are accomplished by my control mechanism is as follows: The ratchet wheels positioned on the shaft 53 are divided into two groups. The ratchet wheels 61, 62, 63, 64, 65 and 66 keyed to the shaft 53, and through these wheels the actual rotation of the cam wheels 70, 71, and 72, and therefore the actual gate-handling operations, are performed, and also the times during which the gates will remain open is controlled. The wheel 67 and the ratchet wheels 68 and 69 which are fastened one to the other, but revolve freely on the shaft 53 regulate the "over all" time interval, that is, the interval between openings of a given gate.

The ratchet wheel 61 is provided with four teeth $61^a$, $61^b$, $61^c$ and $61^d$ which are positioned at intervals of eight inches on the circumference as shown in Figs. 12 and 14. When one of these teeth is brought under the pawl 54 the wheel 61 is rotated by one stroke through four inches of its circumference. The teeth on the wheel 61 are so positioned in relation to the camming surfaces of the wheels 70, 71 and 72 that when the first tooth $61^a$ on the wheel 61 is moved it rotates the shaft 53 and with it the wheel 72, the camming surface of which raises the lever 75, and through the rod 24 the arm 23 opens the gate in the floor of the kettle C, thereby allowing the charge in the kettle C to be dumped into kettle D. When the second tooth $61^b$ of the wheel 61 is driven forward by the pawl 54, the lever 75 is allowed to drop, closing the door in the floor of kettle C, and immediately thereafter the lever 74 is raised by the cam wheel 71, and the gate 19 opened, allowing the charge in kettle B to be dumped into kettle C. When the third tooth $61^c$ on wheel 61 is driven forward by the pawl 54, the lever 74 drops, closing the gate 19, and immediately thereafter the cam surface on wheel 70 raises the lever 73 and opens the gate 17, allowing the charge in kettle A to be dumped into kettle B. At the same time the gate 12 is closed (through the arm 13, and the rod 14 pivoted to the arm 15) so that at the time the gate 17 is opened, no raw meal can be admitted to kettle A. The fourth tooth $61^d$ on wheel 61 serves to close gate 17 and re-open gate 12.

It is to be understood, however, that as the pawls carried by the shaft 51 have only a four-inch movement, and as the teeth on wheel 61 are eight inches apart, there are idle spaces on the circumference of wheel 61, between the teeth, over which the pawl 54 will slide smoothly without causing the wheel 61 to rotate. As shown in Figs. 12 and 14, the ratchet wheel 62 is provided with three sets of teeth $62^a$, $62^b$ and $62^c$, there being eight one-half inch teeth in each set. These teeth are so positioned that they come immediately behind the first three teeth of wheel 61. Above the wheel 62 there is provided a shield 80, which encircles the shaft 53 and is held in permanent position by the arm 81, which encircles the shaft 42. This shield 80 is so located that the pawl 55 will be able to engage only one of the one-half inch teeth on the wheel 62 in each stroke. By this arrangement, after the first tooth $61^a$ on the wheel 61 has been driven rapidly forward by the action of pawl 54, the first tooth of the first set of teeth $62^a$ on wheel 62 is brought into operative relation with pawl 55. This pawl driving the wheel 62 around at the rate of only one-half an inch of its circumference per stroke will, at the end of eight strokes or two minutes, bring the second tooth $61^b$ on wheel 61 into position to be driven forward by pawl 54. When the first set of teeth $62^a$ on wheel 62 is in operative relation with pawl 55, owing to the short movement that is given by each impulse of pawl 55, the shaft 53 rotates relatively slowly and during this time the broad camming surface of cam wheel 72 will remain in operative relation with lever 75 and the gate in the floor of kettle C will be kept open. When the second tooth $61^b$ on wheel 61 is driven forward by pawl 54, shaft 53 is again given a rapid rotation, so that only the time of one forward stroke of pawl 54 or one eighth of a minute is consumed in closing the gate in the floor of kettle C and opening the gate 19 in the floor of kettle B.

The operation of pawl 54 on the second tooth $61^b$ on wheel 61 will, in turn, bring the second set of teeth $62^b$ on wheel 62 into operative relation with pawl 55, and the pawl 55 will take eight strokes or two minutes to bring the third tooth $61^c$ on wheel 61 into operative relation with the pawl 54. In like manner the third set of teeth $62^c$ on the wheel 62 will bring the fourth tooth $61^d$ on the wheel 61 into operation. After the fourth tooth $61^d$ on the wheel 61 has been driven forward so that all of the gates in the floors of the kettle are closed, smooth portions of the wheels 61 and 62 will be under pawls 54 and 55, so that no rotation of these wheels will be caused by these pawls.

In order that the length of time which each of the gates may be left open may be separately adjusted, I provide the ratchet wheels 63, 64 and 65, each of which has one tooth $63^a$, $64^a$, and $65^a$. Above the wheel 63 I provide the shield 82, the position of which may be adjusted by the arm 83; above the wheel 64 is a shield 84, adjustable by the arm 85, and above the wheel 65 is a shield 86, adjustable by the arm 87. The relative position of the teeth $63^a$, $64^a$ and $65^a$ on the wheels 63, 64 and 65 is shown in Figs. 13 and 14. Fig. 13 also shows the manner in which the shields 82, 84 and 86 are adjusted. This adjustment is maintained by the use of a guide 88 and a pin 89 as is shown in Figs. 5 and 7. The teeth $63^a$, $64^a$ and $65^a$ on wheels 63, 64 and 65 are so located with reference to the three sets of eight teeth 62ª, 62ᵇ and 62ᶜ on wheel 62 that if the adjustable shields 82, 84 and 86 are placed parallel with the shield 80, the tooth 65ª on wheel 65 will come into operative relation with the pawl 56 at the same time that the last tooth in the first set of teeth 62ª on the wheel 62 comes into operative relation with the pawl 55, the tooth 64ª on wheel 64 will come into operative relation with pawl 57 at the same time that the last tooth in the second set of teeth 62ᵇ on wheel 62 comes into operative relation with pawl 55, and the tooth 63ª on wheel 63 will come into operative relation with pawl 58 at the same time that the last tooth in the third set of teeth 62ᶜ on wheel 62 comes into operative relation with pawl 55. As the pawls 56, 57 and 58 drive the wheels 63, 64 and 65 forward only one-half an inch with the shields 82, 84 and 86 in this position, none of the wheels 63, 64 or 65 have any effect on the rotation of the shaft 53, and the full two minutes of opening is allowed for each of the gates in the bottoms of kettles A, B and C. If, however, the shield 86 is set back a space of one-half an inch, pawl 58 picks up tooth 65ª on wheel 65 at the same time that pawl 55 engages the seventh tooth of the first set of teeth 62ª on wheel 62, and wheel 65 is driven forward one inch, that is, two tooth-spaces, carrying with it shaft 53, so that the time that the door in the floor of kettle C remains open is shortened by one-quarter of a minute. For every one-half an inch that shield 86 is set back, one tooth in the first set of teeth 62ª on the wheel 62 is thrown out of operation, and the length of time for which the gate in the floor of kettle C remains open, is shortened a quarter of a minute. Thus, by the adjustment of shield 86, the time which the gate in the floor of kettle C remains open may be adjusted at quarter-minute intervals, from one-quarter of a minute to two minutes. In exactly the same manner the length of time which the gate 19 in the floor of kettle B remains open may be adjusted, by shifting the shield 84, and the length of time which the gate 17 in the floor of kettle A remains open may be adjusted by shifting the position of shield 82. As has already been stated, when the fourth tooth 61ᵈ on the wheel 61 has been driven forward by the pawl 54, the pawls 54, 55, 56, 57 and 58 contact with smooth portions of their respective wheels, and cause no further rotation of shaft 53.

After the gate 17 has been closed, the gate-opening mechanism remains at rest until the meal has been cooked for a sufficient length of time, and then again is brought into operation. The automatic control for the "over all" timing apparatus, consists in wheels 67, 68 and 69. These wheels rotate freely on the shaft 53, but are all connected together. The ratchet wheel 68 is provided with ninety-two one-half inch teeth. The pawl 59 which engages the wheel 68 has a sufficient movement, owing to the reciprocation of shaft 51 to operate eight teeth per stroke, but a shield 90 is provided which prevents pawl 59 from moving the wheel 68 more than one tooth per stroke. The ratchet wheel 69 which is attached to ratchet wheel 68, has only four teeth, and these teeth are separated by a distance at least as great as eight of the teeth on ratchet wheel 68. The relative positions of ratchet wheels 68 and 69 is shown in Fig. 11. An adjustable shield 91 is provided to control the engagement of pawl 60 with the teeth of ratchet wheel 69. With this shield 91 placed exactly parallel to the shield 90, it will take ninety-two strokes of the pawls 59 and 60 to revolve the wheels 68 and 69, and as the pawls move four times in a minute, this will take twenty-three minutes. If, however, the shield 91 be revolved backward to the position shown in Fig. 11, it will uncover the teeth on wheel 69 "one tooth-space" in advance and the pawl 60 will, when a tooth comes around, catch it in time to move wheel 69 and with it wheel 68 "two tooth-spaces" in one stroke. This action occurs with each of the four teeth on wheel 69, and consequently shortens up the period of revolution of these two wheels 68 and 69 by four "tooth-spaces", or the equivalent of one minute. If the shield 81 is set back another tooth-space, it will shorten the period two minutes, and so on, until, with the shield set back seven tooth-spaces, the pawl 60, four times during a single revolution, moves the wheel 69 and with it wheel 68 for the full limit of its stroke of eight teeth, instead of one, shortening the entire time of revolution of these two wheels by seven minutes; that is, by the adjustment of the shield 91 the total time of revolution of wheels 68 and 69 can be regulated to take up from sixteen to twenty-three minutes. The adjustment of shield 91 is accomplished by means of the lever 92, which may be held in proper position by a pin as 89 inserted in the guide 88.

The connection between the "over-all" timing apparatus and the gate-operating mechanism, consists in lug 93 on the wheel 66, which is keyed to the shaft 53, as is shown in Figs. 9 and 10, and in the lug 94 on wheel 67, which is attached to wheels 68 and 69. These two lugs 93 and 94 coöperate as follows: When the first tooth on wheel 61 is driven forward by pawl 54, wheel 66 will move more rapidly than wheel 67 and lug 93 will stay ahead of lug 94 until the fourth tooth on wheel 61 has been driven forward by pawl 54. Wheel 66, together with shaft 53 and the other wheels which are keyed to this shaft, will then remain at rest until the wheel 67 is rotated so that lug 94 catches up with and engages lug 93. Then as wheels 68 and 69 rotate they will carry with them the various wheels keyed to shaft 53, until the first tooth on wheel 61 is again brought into operative relation with pawl 54, whereupon wheel 66 will once more rotate more rapidly than wheel 67 and lug 93 will remain ahead of lug 94 until the gate-opening operation is completed. By this arrangement the adjustment of the time that the gates remain open is made entirely separate from the "over all" adjustment during which all of the gates remain closed.
If desired, the "over all" timing of the oil seed cooker may be made directly dependent upon the control of the operator, instead of having the operation mechanically governed. I have provided in my device means whereby the "over all" timing mechanism may be disconnected, and means whereby the operator can manually set the gate-opening mechanism into operation. To accomplish this result a shield-lever 95 is positioned contiguous to the wheel 68 as is shown in Fig. 5. The shield-lever 95 is provided with a slot 96 through which passes a screw 97, by means of which the lever 95 is attached to the bracket 98, which is an integral part of the casing 37. As shown in Fig. 8, the lever 95 has a shoulder 99 on its upper edge and a recess 100 in its lower edge. The lever 95 is likewise provided with a vertical slot 101 and a circular hole 102. When it is desired that the "over all" timing mechanism shall be thrown out of operation the lever 95 is moved into the position shown in Fig. 8 and a pin, as 89, is passed through the slot 101 into the guide
88. In this position the shoulder 99 is immediately below the point where the pawl 59 will normally engage the teeth of the wheel 68. On the face of the wheel 68 is provided a pin 103, which is so located that just before the first tooth on wheel 61 is brought into engagement with the pawl 54, this pin engages and lifts the lever-arm 95, so that the shoulder 99 will prevent the pawl 59 from engaging the teeth of the wheel 68. When it is desired to use the "over all" timing mechanism, the lever 95 is pushed into the casing as far as allowed by the slot 96 and the pin, as 89, is passed through the hole 102, instead of the slot 101, into the guide 88. When the lever 95 is in this position it is inoperative because the rotation of the wheel 68 causes the pin 103 to enter the recess 100 in the lever 95 instead of striking the lever and lifting it.
To set the gate-opening mechanism into operation when the "over all" timing device is disconnected, I supply a ring 104, which rotates about the inwardly projecting portions 105 and 106 of the wheels 66 and 67 respectively, as is shown in Fig. 9. Extending from the ring 104 is a lever 107, and also a projection 108, to which are pivoted pawls 109 and 110, adapted to coöperate with the teeth on wheels 66 and 67 respectively.

When the lever 95 has been set so the mechanism operates without the "over all" timing device, the wheels all rotate in their usual manner until, just before the time when the first tooth $61^a$ on wheel 61 is brought into position to coöperate with pawl 54. The pin 103 on the wheel 68 then raises the lever 95, which engages the projecting edge of the pawl 59 and holds it out of operation, and the mechanism is thereupon brought to rest. To start the mechanism again the lever 107 is manually raised, until the pawls 109 and 110 engage teeth on the wheels 66 and 67, and is then lowered, thereby rotating the wheels 66 and 67 and through them, all of the ratchet wheels of the device. As the rotation of the wheel 68 is thus continued it causes the pin 103 to move along the under side of the lever 95 and enter the recess 100. This will allow the lever 95 to drop, and thereupon pawl 59 will be able to engage wheel 68 in its usual manner, and the automatic operation of the mechanism will be resumed.

The lever 107 can likewise be used to bring the various wheels into any desired position when the machine is at rest. For example, when the machine is first started up, it will be desired to bring the mechanism into the position where the gate 17 has just been allowed to close. This can be readily done by manual actuation of the lever 107.

The weights 76, 77 and 78 are ordinarily sufficient to hold the gates in the floors of the various kettles closed, but in order to insure against accidental opening I provide a lock for each of the gates. My preferred form of lock is shown in detail in Figs. 15 and 16, as applied to gate 19. Referring to these figures, the gate shaft 20 has keyed on it, near its outer end, a sleeve 111, having a segmental recess 112, which forms shoulders 113 and 114. Integral with the sleeve 111 is a cam wheel 115 having a shoulder 116. The arm 21 is provided with a sleeve 117, which pivots on the shaft 20 and has a segmental projection 118, with faces 119 and 120. The segmental projection 118 fits into and is adapted to co-act with the segmental recess 112. Pivoted above the cam wheel 115 is a stop lever 121, provided with a shoulder 122. Pivoted to the stop lever 121 is an arm 123, provided with a slot 124. A bolt 125 passes through the rod 22, the slot 124 of the arm 123 and the arm 21. When the gate 19 is closed, the parts are in the position shown in Fig. 15. As the rod 22 is raised, the arm 123 raises the stop lever 121, so that the shoulder 122 becomes disengaged from the shoulder 116. The face 120 on the segmental projection 118 then engages the shoulder 114 on the segmental recess 112, and further upward movement of the rod 22 will cause the gate 19 to open. After the gate 19 has remained open a sufficient length of time, the rod 22 drops causing the sleeve 117 to rotate, and by the engagement of the face 119 of the segmental projection 118 with the shoulder 113 of the segmental recess 112, the gate 19 is closed. At the same time the shoulder 122 is allowed to ride up the cam surface of the cam wheel 115, owing to the play of the bolt 125 in the slot 124. When the gate 19 is completely closed the shoulder 122 drops by gravity behind the shoulder 116, and the gate will be locked.

In order to prevent undesirable rotation of the wheels 67, 68 and 69 I provide a locking pawl 126 pivoted on the shaft 42 adapted to engage the teeth on ratchet wheel 68.

It is obvious that any desired number or arrangement of kettles may be employed, or any suitable form of controlling mechanism may be utilized to accomplish the results attained by my invention, and that various other modifications may be made in the structure which I have shown and described herein without departing from my invention.

What I claim is:

1. In an oil seed cooker, the combination of a plurality of kettles, a gate through which the charge in one of the said kettles may be dumped into another of the said kettles, means for opening the said gate, and adjustable means connected with the said gate, adapted automatically to close the said gate after a determinable period of time.

2. In an oil seed cooker, the combination of a plurality of kettles, a gate through which the charge in one of the said kettles may be dumped into another of the said kettles, automatic means for periodically opening and closing the said gate, and adjustable means for fixing the times when said gate shall open.

3. In an oil seed cooker, the combination of a plurality of kettles, a gate through which the charge in one of the said kettles may be dumped into another of said kettles, automatic means for periodically opening said gate and closing said gate after substantially all the said charge has been dumped, and adjustable means for fixing the times when said gate shall open.

4. In an oil seed cooker, a plurality of kettles, gates between the said kettles, means for opening the said gates, and adjustable means connected therewith, adapted automatically to close one of said gates after a determinable period of time and thereafter to open and close another of the said gates.

5. In an oil seed cooker, a plurality of kettles, gates between the said kettles, means for opening the said gates, means connected therewith adapted automatically to close one of said gates and thereafter to open and close another of said gates, and adjustable means for fixing the periods of time that the said gates shall remain open.

6. In an oil seed cooker, a plurality of kettles, gates between the said kettles, and automatic means connected with said gates adapted periodically to open one of said gates, at determinable intervals of time, to close the said gate after substantially all of the charge behind the said gate has been dumped, and thereafter to open and close another of the said gates.

7. In an oil seed cooker, a plurality of kettles, gates between the said kettles, automatic means connected with said gates adapted periodically to open and close one of the said gates and thereafter to open and close another of the said gates, and adjustable means for fixing the times when the said gates shall open.

8. In an oil seed cooker, a plurality of kettles, gates between the said kettles, and automatic means connected with said gates adapted periodically to open the said gates one at a time at determinable intervals of time and to close each of the said gates after substantially all of the charge behind it has been dumped.

9. In an oil seed cooker, a plurality of kettles, gates between the said kettles, automatic means connected with said gates adapted periodically to open the said gates one at a time and to close each of the said gates after substantially all of the charge behind it has been dumped, and adjustable means for fixing the times when the said gates shall open.

10. In an oil seed cooker, a plurality of superimposed kettles, gates in the lower portions of the said kettles, automatic operating mechanism connected with said gates adapted periodically to open the gate in one of the said kettles, to close the said gate and thereafter to open and close the gate in the kettle next above, and adjusting means in connection with said operating mechanism whereby the times when said first-mentioned gate will be opened may be determined independently of the speed at which said operating mechanism is driven.

11. In an oil seed cooker, a plurality of superimposed kettles, gates in the lower portions of the said kettles, means for opening the gate in one of the said kettles, and adjustable means adapted automatically to close the said gate after a determinable period of time and thereafter to open and close the gate in the kettle next above.

12. In an oil seed cooker, a plurality of kettles, gates between the said kettles, a lever operatively connected with each of the said gates, cam wheels adapted to coöperate with each of the said levers, a common shaft carrying said cam wheels, and means for rotating the said shaft to open and close the said gates.

13. In an oil seed cooker, a plurality of kettles, gates between the said kettles, a lever operatively connected with each of the said gates, cam wheels adapted to coöperate with the said levers to open and close the said gates one after another, a shaft carrying the said cam wheels, and means for causing the said shaft to rotate at various predetermined speeds during a single revolution.

14. In an oil seed cooker, a plurality of kettles, gates between the said kettles, a lever operatively connected with each of the said gates, cam wheels adapted to coöperate with the said levers to open and close the said gates one after another, a shaft carrying the said cam wheels, means for causing the said shaft to rotate, adjustable means for regulating the time which the said shaft consumes to accomplish one revolution, and independently adjustable means for regulating the time which the said shaft consumes to accomplish a predetermined portion of a revolution.

15. In an oil seed cooker, a plurality of kettles, gates between the said kettles, a lever operatively connected with each of the said gates, cam wheels adapted to coöperate with the said levers to open and close the said gates one after another, a shaft carrying the said cam wheels, means for causing said shaft to start to revolve, and adjustable means for causing said shaft to consume a predetermined period of time while accomplishing a predetermined portion of a revolution.

16. In an oil seed cooker, a plurality of kettles, gates between the said kettles, a lever operatively connected with each of the said gates, cam wheels adapted to coöperate with the said levers to open and close the said gates one after another, a shaft carrying the said cam wheels, means for causing said shaft to start to revolve, and adjustable means for causing said shaft to consume a predetermined period of time while the said cam wheels are co-acting with the said levers to open and close the said gates.

17. In an oil seed cooker, a plurality of kettles, gates between the said kettles, a lever operatively connected with each of the said gates, cam wheels adapted to coöperate with the said levers to open and close the said gates one after another, a shaft carrying the said cam wheels, means for rotating the said shaft, means for causing the said shaft to consume a predetermined period of time to accomplish a predetermined portion of a revolution, and adjustable means for regulating the time which the said shaft consumes to accomplish a complete revolution.

18. In an oil seed cooker, a plurality of kettles, gates between the said kettles, a lever operatively connected with each of the said gates, cam wheels adapted to coöperate with the said levers to open and close the said gates one after another, a shaft carrying the said cam wheels, means for rotating the said shaft, means for causing the said shaft to consume a predetermined period of time while the said cam wheels are co-acting with the said levers to open and close the said gates, and adjustable means for causing the said shaft to consume a predetermined period of time while accomplishing a complete revolution.

19. In an oil seed cooker, a plurality of kettles, gates between the said kettles, locks for the said gates, and automatic means adapted to unlock and open one of said gates, to close said gate after a predetermined period of time and thereafter to unlock, open and close another of said gates.

20. In an oil seed cooker, a plurality of kettles, gates between the said kettles, mechanism for opening said gates in succession, automatic controlling mechanism for causing said gate-opening mechanism to operate periodically, manually-operated controlling mechanism for causing said gate-opening mechanism to operate, and selective means whereby either said automatic controlling mechanism or said manually-operated controlling mechanism may be brought into control of said gate-opening mechanism.

ANTHONY WALKER.

Witnesses:
THAD L. FARNHAM,
L. K. NEVIN.

Copies of this patent may be obtained for five cents each, by addressing the "Commissioner of Patents. Washington, D. C."